US012706634B2

(12) United States Patent
Wilhelmsson et al.

(10) Patent No.: US 12,706,634 B2
(45) Date of Patent: Aug. 11, 2026

(54) TRANSMITTING DATA

(71) Applicant: Telefonaktiebolaget LM Ericsson (publ), Stockholm (SE)

(72) Inventors: Leif Wilhelmsson, Lund (SE); David Sugirtharaj, Lund (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 18/704,281

(22) PCT Filed: Oct. 28, 2021

(86) PCT No.: PCT/EP2021/079954
§ 371 (c)(1),
(2) Date: Apr. 24, 2024

(87) PCT Pub. No.: WO2023/072394
PCT Pub. Date: May 4, 2023

(65) Prior Publication Data
US 2024/0421849 A1 Dec. 19, 2024

(51) Int. Cl.
*H04B 1/715* (2011.01)
*H04W 74/0808* (2024.01)

(52) U.S. Cl.
CPC ........ *H04B 1/715* (2013.01); *H04W 74/0808* (2013.01); *H04B 2201/71346* (2013.01)

(58) Field of Classification Search
CPC ............... H04W 74/0808; H04B 1/715; H04B 2201/71346
See application file for complete search history.

(56) References Cited

U.S. PATENT DOCUMENTS

| | | | |
|---|---|---|---|
| 1,128,405 | A | 2/1915 | Brooks |
| 5,859,664 | A | 1/1999 | Dent et al. |
| 6,246,713 | B1 | 6/2001 | Mattisson et al. |
| 6,941,110 | B2 | 9/2005 | Kloper et al. |
| 7,006,451 | B2 | 2/2006 | Kuwahara et al. |
| 7,154,938 | B2 | 12/2006 | Cumeralto et al. |
| 7,245,649 | B2 | 7/2007 | Haartsen et al. |
| 7,411,994 | B2 | 8/2008 | Haartsen et al. |

(Continued)

FOREIGN PATENT DOCUMENTS

| | | | |
|---|---|---|---|
| EP | 1220499 | A2 | 7/2002 |
| GB | 2399982 | A | 9/2004 |
| WO | 2007009043 | A1 | 1/2007 |

OTHER PUBLICATIONS

International Search Report and Written Opinion dated Aug. 1, 2022 for International Application No. PCT/EP2021/079954 filed Oct. 28, 2021; consisting of 14 pages.

(Continued)

*Primary Examiner* — Jaison Joseph
(74) *Attorney, Agent, or Firm* — Weisberg I.P. Law, P.A.

(57) ABSTRACT

Methods and apparatus are provided. In an example aspect, a method in a first wireless communication device of transmitting data is provided. The method includes determining that each of a plurality of frequency ranges is free for a transmission by the first wireless communication device, selecting one or more of the frequency ranges, and transmitting the data using one or more frequency ranges other than the selected one or more frequency ranges.

10 Claims, 3 Drawing Sheets

(56) References Cited

U.S. PATENT DOCUMENTS 7,945,206 B2 5/2011 Wilhelmsson et al.
8,374,211 B2* 2/2013 Bienas .................. H04L 5/0039 375/132
8,442,016 B1 5/2013 Lee et al.
8,457,023 B2* 6/2013 Norlen .................. H04W 16/14 370/344
8,780,872 B1 7/2014 Ramamurthy et al.
8,867,516 B2 10/2014 Jung et al.
8,958,456 B2 2/2015 Nagai et al.
9,325,369 B2 4/2016 Lee et al.
9,654,443 B2 5/2017 Lindoff et al.
9,693,369 B2 6/2017 Nilsson et al.
9,706,549 B2 7/2017 Taira et al.
9,774,366 B2* 9/2017 Webb .................. H04W 72/542
9,871,577 B2 1/2018 Haziza et al.
9,985,816 B2 5/2018 Di Taranto et al.
10,020,840 B2 7/2018 Lee et al.
10,389,402 B1 8/2019 Krohn et al.
10,405,345 B2 9/2019 Lindoff et al.
10,516,569 B2 12/2019 Lindoff et al.
10,594,360 B2* 3/2020 Vijayasankar ....... H04B 1/7143
10,715,265 B2 7/2020 Siomina et al.
10,904,885 B2 1/2021 Lopez et al.
11,165,619 B2 11/2021 Wilhelmsson et al.
11,201,775 B2 12/2021 Lopez et al.
11,251,830 B2 2/2022 Drugge et al.
11,627,587 B2 4/2023 Aly et al.
11,784,744 B2 10/2023 Wilhelmsson et al.
12,035,297 B2 7/2024 Aly et al.
12,176,941 B2 12/2024 Rahmes et al.
12,206,493 B2 1/2025 Bergman et al.
12,219,483 B2 2/2025 Wilhelmsson et al.
12,273,930 B2 4/2025 Wang et al.
2002/0080739 A1* 6/2002 Kuwahara .............. H04B 1/715 370/333
2002/0080855 A1* 6/2002 Watanabe .............. H04B 1/715 375/E1.035
2003/0156624 A1 8/2003 Koslar et al.
2004/0125889 A1 7/2004 Cumeralto et al.
2004/0137849 A1 7/2004 Kloper et al.
2004/0240526 A1* 12/2004 Schmandt .............. H04B 1/715 375/135
2005/0059388 A1 3/2005 Haines et al.
2005/0084031 A1 4/2005 Rosen et al.
2005/0084033 A1 4/2005 Rosen et al.
2005/0276241 A1 12/2005 Kamerman et al.
2007/0242769 A1 10/2007 Yang et al.
2009/0161730 A1* 6/2009 Fudge ................ H04B 1/71637 375/135
2009/0247076 A1 10/2009 Bartlett et al.
2010/0029204 A1 2/2010 Gao et al.
2011/0116490 A1 5/2011 Wilhelmsson et al.
2012/0076173 A1 3/2012 Chang et al.
2012/0129456 A1 5/2012 Xhafa et al.
2012/0207040 A1 8/2012 Comsa et al.
2013/0022083 A1 1/2013 Vasseur et al.
2013/0039239 A1 2/2013 Lin et al.
2013/0057711 A1 3/2013 Jung et al.
2013/0184020 A1 7/2013 Hoshihara et al.
2013/0308685 A1 11/2013 Nagai et al.
2014/0146857 A1 5/2014 Guichard et al.
2014/0269534 A1 9/2014 Persson et al.
2014/0349594 A1 11/2014 Hoshihara et al.
2015/0009904 A1 1/2015 Chen et al.
2015/0126188 A1 5/2015 Lindoff et al.
2015/0156165 A1 6/2015 Lindoff et al.
2015/0300990 A1 10/2015 Estevez et al.
2015/0303990 A1* 10/2015 Chen .................... H04B 17/382 375/132
2016/0088608 A1 3/2016 Lindoff et al.
2016/0337176 A1 11/2016 Lindoff et al.
2016/0337177 A1 11/2016 Lindoff et al.
2017/0134882 A1 5/2017 Kao et al.
2017/0155443 A1 6/2017 Haziza et al.
2017/0288792 A1 10/2017 Kim et al.
2017/0310357 A1 10/2017 Lee et al.
2018/0097680 A1 4/2018 Di Taranto et al.
2019/0028141 A1* 1/2019 Padden ................ H04B 1/7156
2019/0123840 A1 4/2019 Siomina et al.
2019/0132844 A1 5/2019 Lopez et al.
2019/0173521 A1 6/2019 Liu et al.
2019/0239140 A1 8/2019 Arickan et al.
2019/0268201 A1 8/2019 Wilhelmsson et al.
2020/0053544 A1 2/2020 Lindoff et al.
2020/0396746 A1 12/2020 Kondareddy et al.
2020/0412591 A1 12/2020 Lopez et al.
2021/0058970 A1* 2/2021 Kwak ................... H04W 72/23
2021/0091891 A1 3/2021 Phan et al.
2021/0120555 A1* 4/2021 Badic .................... H04W 72/12
2021/0159940 A1 5/2021 Drugge et al.
2021/0168831 A1 6/2021 Wilhelmsson et al.
2021/0204140 A1 7/2021 Ghosh et al.
2021/0266925 A1 8/2021 Aly et al.
2021/0368529 A1 11/2021 Sakhnini et al.
2021/0409172 A1 12/2021 Chen et al.
2022/0038323 A1 2/2022 Wilhelmsson et al.
2022/0104141 A1 3/2022 Kondareddy et al.
2022/0137177 A1 5/2022 Hammerschmidt et al.
2022/0159677 A1 5/2022 Hwang et al.
2022/0166576 A1 5/2022 Harada et al.
2022/0201610 A1 6/2022 Wilhelmsson et al.
2022/0225462 A1 7/2022 Manolakos et al.
2022/0417953 A1* 12/2022 Petkov .............. H04W 28/0268
2023/0087730 A1 3/2023 Narula et al.
2023/0121235 A1 4/2023 Gunn et al.
2023/0224958 A1 7/2023 Lee et al.
2023/0262709 A1 8/2023 Yu et al.
2023/0276428 A1 8/2023 Aly et al.
2023/0396354 A1 12/2023 Wilhelmsson et al.
2024/0015686 A1 1/2024 Rao et al.
2024/0103123 A1 3/2024 Meier et al.
2024/0106494 A1 3/2024 Rahmes et al.
2024/0251441 A1 7/2024 Wilhelmsson et al.
2024/0406855 A1 12/2024 Wilhelmsson et al.
2024/0421849 A1 12/2024 Wilhelmsson et al.
2024/0421850 A1 12/2024 Wilhelmsson et al.
2025/0142498 A1 5/2025 Lanante et al.
2025/0176025 A1 5/2025 Liu et al.

OTHER PUBLICATIONS

International Search Report and Written Opinion dated Jul. 18, 2022 for International Application No. PCT/EP2020/079955 filed Oct. 28, 2021; consisting of 11 pages.
Notice of Allowance dated Jul. 7, 2025 for U.S. Appl. No. 18/704,781, consisting of 19 pages.
Notice of Allowance dated Aug. 12, 2025 for U.S. Appl. No. 18/704,781, consisting of 21 pages.

* cited by examiner

Determining that each of a plurality of frequency ranges is free for a transmission by the first wireless communication device — 202

Selecting one or more of the frequency ranges — 204

Transmitting the data using one or more frequency ranges other than the selected one or more frequency ranges — 206

200

TRANSMITTING DATA

CROSS-REFERENCE TO RELATED APPLICATION

This application is a Submission Under 35 U.S.C. § 371 for U.S. National Stage Patent Application of International Application Number: PCT/EP2021/079954, filed Oct. 28, 2021 entitled "TRANSMITTING DATA," the entirety of which is incorporated herein by reference.

TECHNICAL FIELD

Examples of the present disclosure relate to transmitting data, for example by a wireless communication device.

BACKGROUND

When undertaking wireless communication in unlicensed bands, such as for example the 2.4 GHz Industrial, Scientific and Medical (ISM) band and the 5 GHz band, some means of spectrum sharing mechanism is typically required unless the transmissions are limited to use a very low power. The two most commonly used spectrum sharing mechanisms are listen before talk (LBT), also referred to as carrier sense multiple access with collision avoidance (CSMA/CA), and frequency hopping (FH).

The working procedure of LBT is as follows. Before a transmission can be initiated, the transmitter listens on the channel to determine whether it is idle or if there is already another transmission ongoing. If the channel is found to be idle, the transmission can be initiated, whereas if the channel is found to be busy, the transmitter must defer from transmission and essentially keep sensing the channel until it becomes idle. LBT is used by different flavors of IEEE 802.11, commonly referred to as Wi-Fi, operating in the 2.4 GHz ISM and 5 GHz bands. LBT is also employed by standards developed by 3GPP operating in the 5 GHz band, e.g. New Radio-Unlicensed (NR-U). If FH is used instead, the spectrum sharing is based on only using a specific part of the band for a relatively small fraction of the total time, leaving room for other transmissions. FH is the approach used by Bluetooth.

Whether to employ LBT or FH is not clear, but typically LBT is the preferred approach if the used channel bandwidth is relatively large, say 20 MHz or more. FH, on the other hand, is well suited for narrowband systems where the bandwidth is of the order of 1 or 2 MHz. To a large extent this explains why Wi-Fi uses LBT whereas Bluetooth uses FH. The primary goal for Wi-Fi is to provide high data rates, with use cases like file download and file streaming. Bluetooth, on the other hand, is more concerned with voice and other delay sensitive applications like connecting computer peripherals.

Although both LBT and FH can be viewed as effective spectrum sharing mechanisms, both typically only work well if all devices are using the same spectrum sharing mechanism, for example if all devices use LBT, or alternatively if all devices use FH. However, issues may arise if some devices use different mechanisms. As one example, a wideband system using LBT may detect a narrowband FH transmission and defer from transmitting, even though the wideband transmission would have been successful without having any noticeable impact on the narrowband transmission. Conversely, for example, a wideband system may not detect a narrowband system, since the average sensed power within the wideband channel is relatively low, and may then initiate a transmission that potentially can result in harmful interference to the narrowband system.

To allow for better coexistence between the two standards, Bluetooth has developed support for adaptive frequency hopping (AFH) utilizing the detect-and-avoid method. In this scheme, a Bluetooth device detects if there are Wi-Fi transmissions on some of the Wi-Fi channels, and then adapts the hopping pattern used for FH such that the frequencies coinciding with the Wi-Fi channels are not used. In Bluetooth Low Energy (BLE), additional specific measures are taken to limit the interference to Wi-Fi by only using three channels for initial link establishment, and where these three channels are selected such that they will not overlap with the three most commonly used Wi-Fi channels (Channel 1, 6 and 11).

AFH has two limitations. The first is that it by necessity takes some time to determine whether a frequency channel should be considered as occupied by another system such as Wi-Fi and therefore should not be used, and also to determine when it is no longer occupied so that it can be used. How long this takes may also depend on how often the channel is used by the other system, and it can be expected that if a Wi-Fi channel is only used, say, 10% of the time many Bluetooth transmissions may be needed in order to determine that in fact the channel is used by Wi-Fi, to gather sufficient information regarding the number of BT transmission failures due to interference.

The second limitation is that AFH only works as long as it is possible to find some channels that are free (or relatively free) from interference. If for instance a Wi-Fi transmitter uses an 80 MHz channel in the ISM band (which is currently not permitted), it is clear that AFH would not work since there are no channels remaining. This may, however, be a problem if Bluetooth or another system that uses something similar to AFH is used in another frequency band such as the 6 GHz band, and uses a total bandwidth of around 80 MHz for example. In the 6 GHz band, Wi-Fi may use 80 MHz, 160 MHz, or even more in the future. This means that AFH may not work as intended if the entire 80 MHz used by Bluetooth is also used by Wi-Fi and also, as a result, that Wi-Fi may detect every Bluetooth transmission and defer from transmitting due to the LBT procedure used by Wi-Fi.

These issues are described in terms of a single Bluetooth link. Since Bluetooth is designed to support a large number of simultaneous links, the problem may be significantly worse for Wi-Fi or other systems where several Bluetooth transmissions can occur in parallel.

SUMMARY

As explained above, a wideband system may use a large bandwidth such that it may impact the effectiveness of a narrowband system such as one using AFH. For example, a wideband system may use a frequency range that covers the entire frequency range used by the narrowband system using frequency hopping.

One aspect of the present disclosure provides a method in a first wireless communication device of transmitting data. The method comprises determining that each of a plurality of frequency ranges is free for a transmission by the first wireless communication device, selecting one or more of the frequency ranges, and transmitting the data using one or more frequency ranges other than the selected one or more frequency ranges.

Another aspect of the present disclosure provides a method in a first wireless communication device of transmitting data. The method comprises determining the presence of interference in one or more frequency ranges of a plurality of frequency ranges, and after determining the presence of interference, determining that a transmission is to be made by the first wireless communication device. The method also comprises selecting one or more of the frequency ranges based on the determination of the presence of interference, and transmitting the data using one or more of the plurality of frequency ranges other than the selected one or more frequency ranges.

A further aspect of the present disclosure provides apparatus in a first wireless communication device for transmitting data. The apparatus comprises a processor and a memory. The memory contains instructions executable by the processor such that the apparatus is operable to determine that each of a plurality of frequency ranges is free for a transmission by the first wireless communication device, select one or more of the frequency ranges, and transmit the data using one or more frequency ranges other than the selected one or more frequency ranges.

A still further aspect of the present disclosure provides apparatus in a first wireless communication device for transmitting data. The apparatus comprises a processor and a memory. The memory contains instructions executable by the processor such that the apparatus is operable to determine the presence of interference in one or more frequency ranges of a plurality of frequency ranges, after determining the presence of interference, determine that a transmission is to be made by the first wireless communication device, select one or more of the frequency ranges based on the determination of the presence of interference, and transmit the data using one or more of the plurality of frequency ranges other than the selected one or more frequency ranges.

An additional aspect of the present disclosure provides apparatus in a first wireless communication device for transmitting data. The apparatus is configured to determine that each of a plurality of frequency ranges is free for a transmission by the first wireless communication device, select one or more of the frequency ranges, and transmit the data using one or more frequency ranges other than the selected one or more frequency ranges.

Another aspect of the present disclosure provides apparatus in a first wireless communication device for transmitting data. The apparatus is configured to determine the presence of interference in one or more frequency ranges of a plurality of frequency ranges, and after determining the presence of interference, determine that a transmission is to be made by the first wireless communication device. The apparatus is also configured to select one or more of the frequency ranges based on the determination of the presence of interference, and transmit the data using one or more of the plurality of frequency ranges other than the selected one or more frequency ranges.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, Application Specific Integrated Circuits (ASICs), Programmable Logic Arrays (PLAs), etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Certain examples of this disclosure are described in the context of a wideband signal, such as for example a Wi-Fi signal, and a narrowband interfering signal that may use frequency hopping (FH), such as for example a Bluetooth signal. However, these are merely non-limiting examples, and the examples described can be applied to any other scenario where a signal to be transmitted has a larger bandwidth than an interfering signal.

Figures 1, 2:
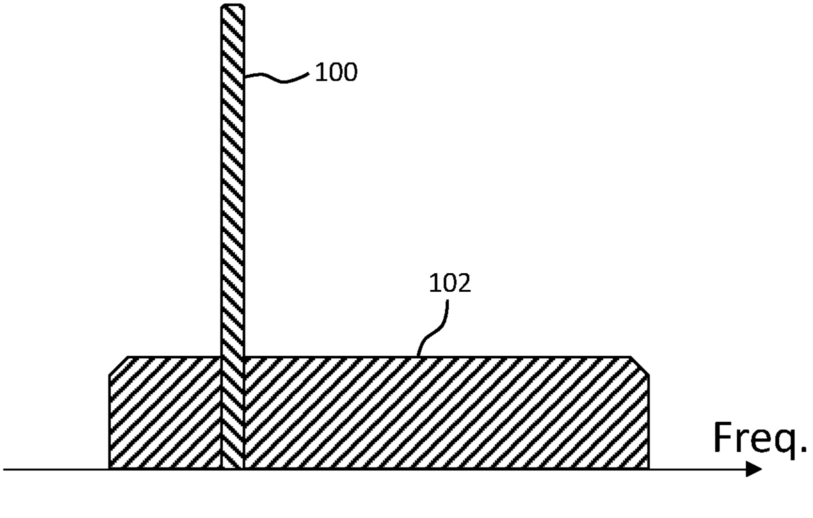
FIG. 1 shows an illustration of how a narrowband signal overlaps with a wideband signal.
FIG. 2 is a flow chart of an example of a method in a first wireless communication device of transmitting data.

FIG. 1 shows an illustration of how a narrowband signal 100 (e.g. a Bluetooth signal) overlaps with a wideband signal 102 (e.g. a Wi-Fi signal) and thus is an interference signal from the point of view of the wideband signal 102. For example, the wideband signal 102 has a first frequency range (and therefore a first bandwidth), and the narrowband signal 100 is within the first frequency range and has a bandwidth that is smaller than the first bandwidth.

In some examples, the narrowband or Bluetooth signal may not be present at the start of the transmission of the wideband or Wi-Fi signal. For example, the transmitter may use listen before talk (LBT) before making a Wi-Fi transmission, i.e. it senses the channel before initiating a transmission. The LBT procedure may indicate that there is no signal present in the first frequency range that the transmitter intends to use for the Wi-Fi transmission. Bluetooth, on the other hand, uses frequency hopping (FH) and will only cause interference to a very limited part of the frequency band, as shown in FIG. 1 for example. Bluetooth may also use adaptive frequency hopping (AFH) in some examples, where the transmitter of a Bluetooth signal avoids using certain frequencies that have been found to be severely interfered e.g. by other systems such as Wi-Fi. AFH is often an effective approach to ensure good coexistence with Wi-Fi by simply detecting and avoiding the Wi-Fi channel. However, when Wi-Fi is using large bandwidths, e.g. 80 MHz, this means that the Bluetooth system may find all channels to be interfered and thus it is not possible to apply AFH to avoid the Wi-Fi channel.

In a particular example, suppose that a Wi-Fi system and a Bluetooth system have spatially overlapping coverage areas. Furthermore, suppose that the bandwidth of the Wi-Fi system is 80 MHz, which roughly corresponds to the total bandwidth of 79 MHz used by Bluetooth. The instantaneous bandwidth of a Bluetooth signal is about 1 MHz, and Bluetooth uses AFH over the entire 79 MHz. The principle of adaptive frequency hopping (AFH) can be described as follows. In a frequency hopping system, the carrier frequency is changed in a pseudo-random fashion. In Bluetooth, this may be every 1.25 ms for example. That is, one Bluetooth transmission from a Master device and the corresponding ACK from the Slave device are sent on the same frequency, whereafter a new frequency channel is used for the next transmission. If Bluetooth is transmitting a packet at every transmission opportunity, this means that all 79 channels will be used in 79×1.25 m=98.75 ms.

For AFH to work well, in some examples, it would thus be able to detect which channels are interfered in for example 1 second. This is assuming that there is no correlation with respect to how the different frequency channels are interfered. If for example it is known that there is an interferer present and its bandwidth will be 20 MHz, then this knowledge can be used to speed up the AFH algorithm considerably. However, AFH by design is intended to avoid the interfered channels and only use the non-interfered channels. For example, a Bluetooth device using AFH may detect the presence of occupied Wi-Fi channels in the 2.4 GHz industrial, scientific and medical (ISM) band. Since Bluetooth uses a 79 MHz bandwidth and a Wi-Fi channel is typically 20 MHz wide in the ISM band, this approach has been useful to avoid occupied Wi-Fi channels in some cases.

However, if a Wi-Fi transmission uses a larger bandwidth, for example 80 MHz, that completely overlaps with the full Bluetooth bandwidth, AFH may not work as intended. However, Wi-Fi may use channel puncturing as means to increase the probability to obtain access to the channel in interference prone environments. An example of the working principle of channel puncturing is as follows. When Wi-Fi performs LBT, it can determine the channel conditions for each 20 MHz sub-channel. For all sub-channels that are found to be idle (i.e. available for transmissions), transmissions may be initiated. For the sub-channels that are found to be busy, on the other hand, no transmission can take place. This means that the corresponding sub-channel is punctured when generating the signal to be transmitted. Since Wi-Fi uses orthogonal frequency division multiplexing (OFDM), puncturing may be achieved for example by simply not transmitting using the corresponding sub-carriers in the occupied sub-channels.

Although LBT with puncturing may improve coexistence by allowing a wideband signal to occupy parts of the channel when other parts are occupied by other transmissions, problems remain. For example, since Bluetooth uses frequency hopping over the entire bandwidth, and the hopping rate is fast compared to the typical duration of a Wi-Fi packet, puncturing will only be effective for the first part of the packet whereas the packet may still be interfered at a later time if a Bluetooth signal hops to a frequency in a non-punctured sub-channel. Also, for example, frequencies that are not punctured in a Wi-Fi signal may act as interference to a Bluetooth signal.

Examples of this disclosure may address or mitigate one or more of the problems described herein by providing a system whereby one or more particular frequency ranges may be unused by a transmission, such as for example a wideband or Wi-Fi transmission, even if such frequency range(s) are determined to be free, such as for example by a Listen Before Talk (LBT) procedure or similar. Leaving such frequency range(s) unused may for example allow a narrowband or Bluetooth transmitter, or a system that uses adaptive frequency hopping (AFH) or a similar system, to determine that the unused frequency range(s) are relatively free compared to some other frequency ranges and thus the AFH or similar system may over time tend to use those unused frequency range(s) instead of other frequency ranges. It is noted here that an unused frequency range is a frequency range that is unused by a transmitter for one or more transmissions, though in some cases the unused frequency range could be used by other transmissions from other transmissions e.g. using a wideband or narrowband system.

In some examples of this disclosure, a wideband system, which supports puncturing, may operate over a bandwidth that potentially covers most or all of the bandwidth or frequency range used by a narrowband system using adaptive frequency hopping (AFH) or similar. The wideband system may employ puncturing, whereby some or all frequency ranges of the available bandwidth (and over which the transmitter is capable of transmitting simultaneously) are used, and where only some ranges are used, these ranges may be contiguous or adjacent, or may be separated in frequency with one or more unused frequency ranges in between. In some examples, a frequency range is a channel such as for example a Wi-Fi channel.

In some examples, the wideband system may use Listen Before Talk (LBT) for access to the communication channel, and use puncturing when one or more frequency ranges are found during the LBT process to be busy. To ensure coexistence with the narrowband system, the wideband system may for example also puncture one or more frequency ranges that were found to be idle or available for transmission during the LBT process. This may be referred to in some examples as proactive puncturing, as it may be a means to proactively prevent coexistence issues that otherwise would occur between the wideband and narrowband systems. By proactively puncturing one or more frequency ranges, a narrowband system using AFH or similar may identify that some frequency ranges are interfered (corresponding to the non-punctured parts of the wideband signal), whereas one or more other frequency ranges are free from interference (corresponding to the punctured parts of the wideband signal). The narrowband system may then in some examples use this observation to adapt its set of hopping frequencies such that only the punctured frequency range(s) are used (or are used more often than other frequency ranges). It is noted that in some examples no changes may be needed to the narrowband system such as a system using AFH or similar. In some examples, the benefits described herein may be achieved without any explicit interaction between the wideband and the narrowband system, and the activity of the wideband system may be transparent to the narrowband system.

If a transmitter is in some examples using a mechanism to determine whether frequency ranges are available, for example LBT, it may therefore also be able to determine the amount of activity in the punctured sub-channels, thus effectively monitoring those frequency ranges. This may then be used in some examples to adapt punctured frequency ranges so that the particular frequency range(s) or number of frequency ranges can be changed depending on activity of the narrowband system.

In some examples, the wideband system may consist of multiple nodes (e.g. cells or access points). Since the narrowband system may be within the coverage area of two or more of these nodes, there may for example be coordination among these nodes such that the same frequency range(s) are unused, even if free or unoccupied, in order to provide benefits to the narrowband system.

FIG. 2 is a flow chart of an example of a method 200 in a first wireless communication device of transmitting data. The first wireless communication device may be for example a wideband or Wi-Fi communication device. The method 200 comprises, in step 202, determining that each of a plurality of frequency ranges is free for a transmission by the first wireless communication device. In some examples, the plurality of frequency ranges may be the entire frequency range that the first wireless communication device is capable of using for transmission. Alternatively, for example, the plurality of frequency ranges may be a subset of frequency ranges that the first wireless communication device is capable of using for transmission, for example where some other frequency ranges are found to be unavailable or occupied, or where a data rate to be used to transmit the data allows for the subset to be used instead of all of the frequency ranges. Each frequency range may in some examples be a channel such as a Wi-Fi channel, e.g. in an unlicensed band such as the 2.4 GHz, 5 GHz or 6 GHz band.

Step 204 of the method 200 comprises selecting one or more of the frequency ranges. Next, step 206 of the method 200 comprises transmitting the data (e.g. to another wireless communication device) using one or more frequency ranges other than the selected one or more frequency ranges, e.g. using a Wi-Fi or 802.11 standard.

In some examples, determining that each of the plurality of frequency ranges is free for a transmission by the first wireless communication device comprises performing a procedure for each of the frequency ranges (the procedure may be carried out in parallel for some or all of the frequency ranges). The procedure may be for example a Listen Before Talk (LBT) procedure on the frequency ranges, such that the LBT procedure indicates that each frequency range is free for a transmission by the first wireless communication device. Alternatively, for example, the procedure may be a Clear Channel Assessment (CCA) procedure on the frequency ranges, such that the CCA procedure indicates that each frequency range is free for a transmission by the first wireless communication device. Alternatively, for example, the procedure may be a Carrier Sense Multiple Access with Collision Avoidance (CSMA-CA) procedure on the frequency ranges, such that the CSMA-CA procedure indicates that each frequency range is free for a transmission by the first wireless communication device.

In some examples, selecting the one or more of the frequency ranges comprises selecting one or more frequency ranges that have been identified previously as being occupied by one or more signals from one or more other wireless communication devices, such as for example at least one narrowband, frequency hopping or Bluetooth signal. This may be done for example if a previous procedure (e.g. a LBT, CSMA-CA or CCA procedure) has indicated that one or more frequency ranges are occupied. Thus, for example, the first wireless communication device may assume that the frequency range(s) were occupied by a narrowband or frequency hopping signal such as a Bluetooth signal, and select one or more of those frequency ranges to avoid when making transmissions.

Selecting the one or more of the frequency ranges may comprise for example selecting one or more frequency ranges if any of the frequency ranges have been identified previously as being occupied by one or more signals from one or more other wireless communication devices. This is similar to the above feature, except that in this example, the selected frequency range(s) may or may not be frequency range(s) that have previously been identified as occupied. This may be the case for example where a previous procedure (e.g. LBT, CSMA-CA or CCA procedure) has identified one or more frequency ranges are occupied, but did not identify those particular range(s) that were occupied. Alternatively, for example, it may be assumed that the interfering signal(s) are frequency hopping, and that they may not remain in the frequency range(s) in which they were previously detected.

In some examples, selecting the one or more of the frequency ranges may comprise selecting one or more frequency ranges if one or more transmissions by the first wireless communication device have been unsuccessful. An unsuccessful transmission may be for example a transmission for which a negative acknowledgement (NACK) has been received by the first wireless communication device, as opposed to an acknowledgement (ACK), or a transmission for which no ACK or NACK is received. The method 200 may also in some examples comprise selecting a first number of frequency ranges if the one or more transmissions that have been unsuccessful comprise a first number of transmissions less than a threshold number, and selecting a second number of frequency ranges if the one or more transmissions that have been unsuccessful comprise a second number of transmissions greater than a threshold number, wherein the first number of frequency ranges is less than the second number of frequency ranges. Thus, for example, a larger number of frequency ranges may be selected and transmission in those frequency ranges avoided for a larger number of failed transmissions.

Selecting the one or more of the frequency ranges may in some examples comprise selecting the one or more of the frequency ranges based on at least one of an indication from another wireless communication device that one or more of the frequency ranges is experiencing or has experienced interference, and an indication identifying one or more of the frequency ranges that is experiencing or has experienced interference. The another wireless communication device may in some examples be a receiver of the data, or alternatively another device.

The method 200 may comprise, in some examples, for each of a plurality of further transmissions for transmitting further data, determining whether each of the plurality of frequency ranges other than the selected one or more frequency ranges is free (e.g. using a procedure such as LBT, CSMA-CA or CCA) for the further transmission by the first wireless communication device. If one or more of the frequency ranges is not free more than a predetermined number of times, the selected one or more frequency ranges (i.e. those that are avoided for transmission by the first wireless communication device) may be reselected. This may be for example because there is excessive interference within the previously selected frequency range(s). Then, the method 200 may comprise transmitting the further transmission data using one or more frequency ranges other than the selected one or more frequency ranges (i.e. other than the reselected frequency range(s)).

Figure 3:
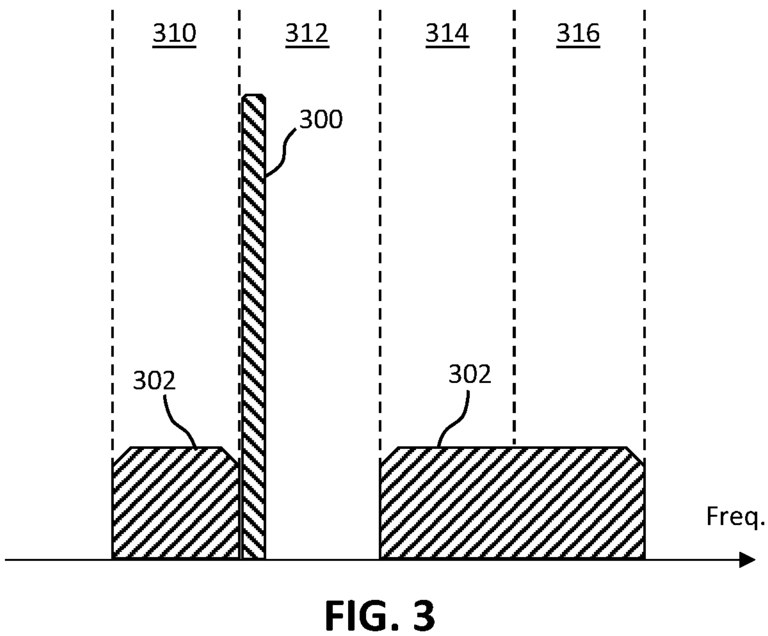
FIG. 3 shows an example of how interference to a narrowband signal may be avoided by transmitting data according to examples of this disclosure.

FIG. 3 shows an example of how interference to a narrowband signal 300 (e.g. a Bluetooth signal) by a wideband signal 302 may be avoided by transmitting data according to examples of this disclosure. The transmitter of the wideband signal may be capable of transmitting simultaneously in a plurality of frequency ranges. In the example shown, there are four contiguous frequency ranges 310, 312, 314 and 316, though there may be another number of frequency ranges in other examples, and/or the frequency ranges may be non-contiguous. It can be seen in this example that the wideband signal 302 occupies multiple non-contiguous frequency ranges, and the wideband signal 302 is not transmitted in frequency range 312. Thus for example the frequency range 312 may be selected for non-transmission or puncturing of the wideband signal 302 in accordance with examples described herein, and the wideband signal 302 is transmitted in frequency ranges 310, 314 and 316. The narrowband signal 300 is located within the frequency range 312 in the example shown in FIG. 3, and thus the wideband signal 302 does not cause interference to the narrowband signal 300 in the particular time instance shown. Similarly, the narrowband signal 300 does not cause interference to the wideband signal 302. The narrowband signal 300 may remain within the frequency range 312 in some examples, for example if the narrowband signal 300 is a frequency hopping signal which uses AFH or a similar approach.

Figure 4:
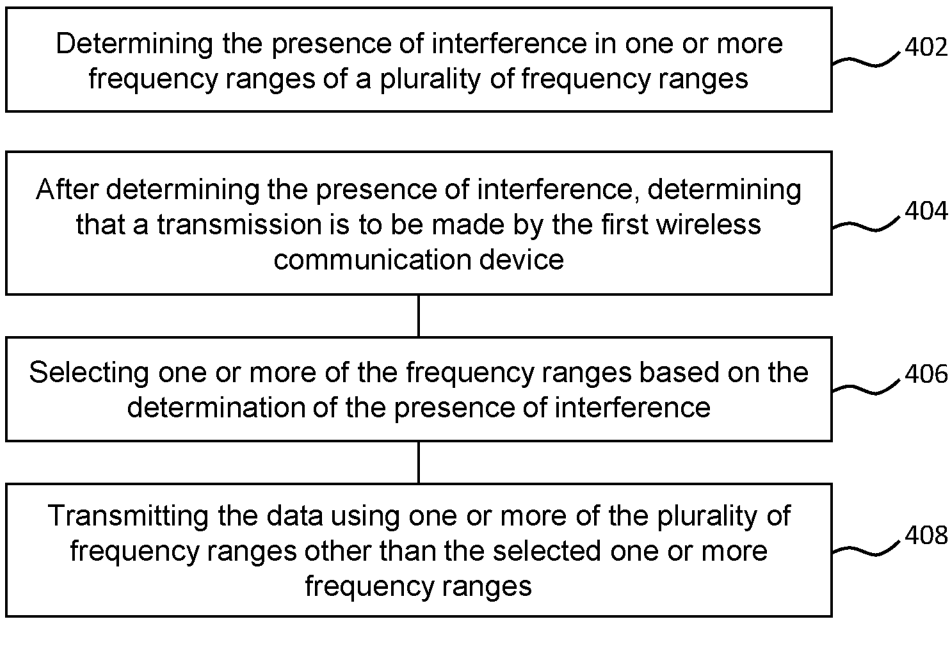
FIG. 4 is a flow chart of another example of a method in a first wireless communication device of transmitting data.

FIG. 4 is a flow chart of another example of a method 400 in a first wireless communication device of transmitting data. The first wireless communication device may be for example a wideband or Wi-Fi communication device. The method 400 comprises, in step 402, determining the presence of interference (e.g. the presence of at least one frequency hopping, narrowband or Bluetooth signal) in one or more frequency ranges of a plurality of frequency ranges. In some examples, the plurality of frequency ranges may be the entire frequency range that the first wireless communication device is capable of using for transmission. Alternatively, for example, the plurality of frequency ranges may be a subset of frequency ranges that the first wireless communication device is capable of using for transmission, for example where some other frequency ranges are found to be unavailable or occupied, or where a data rate to be used to transmit the data allows for the subset to be used instead of all of the frequency ranges. Each frequency range may in some examples be a channel such as a Wi-Fi channel, e.g. in an unlicensed band such as the 2.4 GHz, 5 GHz or 6 GHz band.

The method 400 also comprises, in step 404, after determining the presence of interference in step 402, determining that a transmission is to be made by the first wireless communication device (e.g. data may be received in a buffer or from a higher layer for transmission to another wireless communication device). Step 406 of the method 400 comprises selecting one or more of the frequency ranges based on the determination of the presence of interference, and step 408 comprises transmitting the data using one or more of the plurality of frequency ranges other than the selected one or more frequency ranges, for example using a Wi-Fi or 802.11 standard, or in unlicensed spectrum.

Determining the presence of interference in the one or more frequency ranges of the plurality of frequency ranges may for example comprise one or more of performing a Listen Before Talk (LBT) procedure, Clear Channel Assessment (CCA) procedure performing a Carrier Sense Multiple Access with Collision Avoidance (CSMA-CA) procedure on each of the one or more frequency ranges of the plurality of frequency ranges. Additionally or alternatively, for example, this may comprise receiving an indication (e.g. from the receiver of the data or another device) from another wireless communication device that one or more of the frequency ranges is experiencing or has experienced interference, or receiving an indication (e.g. from the receiver of the data or another device) identifying one or more of the frequency ranges that is experiencing or has experienced interference.

Transmitting the data using one or more frequency ranges other than the selected one or more frequency ranges in step 408 may in some examples comprise determining that each of the one or more frequency ranges of the plurality of frequency ranges other than the selected one or more frequency ranges is free for a transmission by the first wireless communication device, e.g. by using a LBT, CCA or CSMA-CA procedure on each of the one or more frequency ranges of the plurality of frequency ranges other than the selected one or more frequency ranges. In some examples, such procedures may also indicate that each of the selected range(s) is free or occupied.

In some examples, determining the presence of interference in the one or more frequency ranges of the plurality of frequency ranges may comprise assuming the presence of interference in the one or more frequency ranges that have been identified previously as being occupied by one or more signals from one or more other wireless communication devices. For example, if there was a previously identified interferer such as a Bluetooth interferer, the first wireless communication device may assume that the interfering signal will return at some point, and may proactively avoid transmitting in the selected frequency range(s). Additionally or alternatively, for example, determining the presence of interference in the one or more frequency ranges of the plurality of frequency ranges comprises determining that one or more transmissions by the first wireless communication device have been unsuccessful. The first wireless communication device may for example assume that the failed transmission(s) were due to a narrowband interferer and thus may decide to proactively avoid transmitting in the selected frequency range(s).

A particular example of this disclosure will now be described as follows. In a first step, a Wi-Fi system (or other wideband system) identifies that there potentially is Bluetooth interference present. This may be based for example on a Wi-Fi receiver identifying that the received wideband signal is interfered by a narrowband interferer. The different Wi-Fi stations (STAs), i.e. the transmitter and receiver (either of which may be an access point in some examples) can then exchange information about which frequency range(s) are interfered in this way to enhance the accuracy or speed up the detection of a Bluetooth interferer. In a second step, the Wi-Fi system determines the bandwidth over which it is suffering from Bluetooth interference. The Wi-Fi system may for example perform a search to see if another Wi-Fi channel is available and switch to this in order to avoid the Bluetooth interference. If no such channel is found available, or if for some other reason the Wi-Fi system decides to stay on the same channel, the next step is initiated.

In a third step, the Wi-Fi system selects one or more sub-channels that are not to be used for transmission. That is, the Wi-Fi signal punctures these sub-channels irrespective of whether a procedure (e.g. LBT, CSMA-CA or CCA)

determines these sub-channels to be busy or idle. In a fourth step, the Wi-Fi system performs transmission, though some of the sub-channels may be semi-permanently punctured. That is, for example, subsequent transmissions may automatically puncture the same channel(s) or frequency range(s). LBT may still be performed in the punctured sub-channels and used for estimating the intensity of the Bluetooth interference.

In a fifth step, which can take place at regular intervals (and may also precede the third step), the Wi-Fi system updates the set of sub-channels or frequency ranges that are punctured. This updating may mean for example increasing the set by one sub-channel or decreasing the set by one sub-channel. An increase of the set may for example be in response to a determination that the amount of interference is very high in the punctured sub-channel(s), and the increase would therefore be made in order to further improve the performance for the Bluetooth system. The amount of interference may be measured for example by determining the percentage that LBT on the punctured channels declare that the channel is busy. The Wi-Fi transmitter may additionally or alternatively for example take the power of the detected interference into account for the cases where sub-channels are found to be busy. For example, a channel may be semi-permanently punctured if the interference power is above a threshold level.

Figure 5:
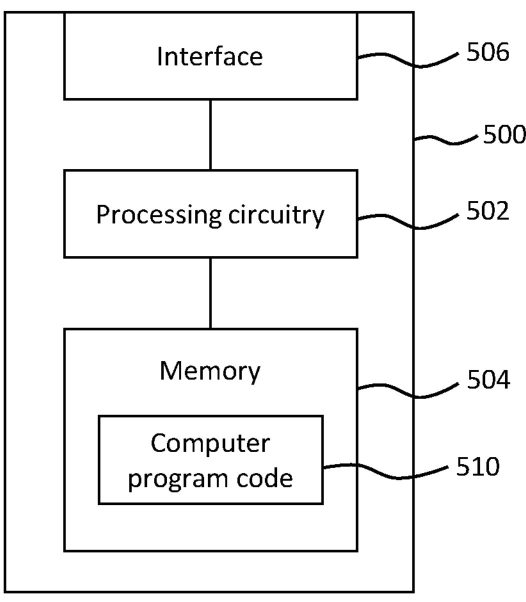
FIG. 5 is a schematic of an example of an apparatus 500 in a first wireless communication device for transmitting data.

FIG. 5 is a schematic of an example of an apparatus 500 in a first wireless communication device for transmitting data. The apparatus 500 comprises processing circuitry 502 (e.g., one or more processors) and a memory 504 in communication with the processing circuitry 502. The memory 504 contains instructions, such as computer program code 510, executable by the processing circuitry 502. The apparatus 500 also comprises an interface 506 in communication with the processing circuitry 502. Although the interface 506, processing circuitry 502 and memory 504 are shown connected in series, these may alternatively be interconnected in any other way, for example via a bus.

In one embodiment, the memory 504 contains instructions executable by the processing circuitry 502 such that the apparatus 500 is operable/configured to determine that each of a plurality of frequency ranges is free for a transmission by the first wireless communication device, select one or more of the frequency ranges, and transmit the data using one or more frequency ranges other than the selected one or more frequency ranges. In some examples, the apparatus 500 is operable/configured to carry out the method 200 described above with reference to FIG. 2.

Figure 6:
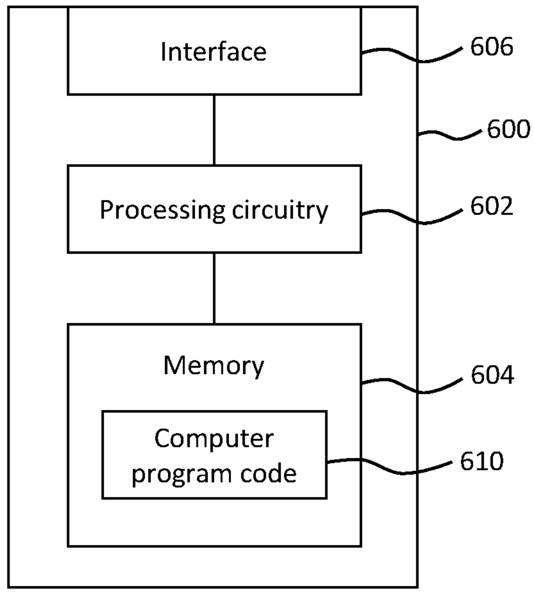
FIG. 6 is a schematic of an example of an apparatus 600 in a first wireless communication device for transmitting data.

FIG. 6 is a schematic of an example of an apparatus 600 in a first wireless communication device for transmitting data. The apparatus 600 comprises processing circuitry 602 (e.g., one or more processors) and a memory 604 in communication with the processing circuitry 602. The memory 604 contains instructions, such as computer program code 610, executable by the processing circuitry 602. The apparatus 600 also comprises an interface 606 in communication with the processing circuitry 602. Although the interface 606, processing circuitry 602 and memory 604 are shown connected in series, these may alternatively be interconnected in any other way, for example via a bus.

In one embodiment, the memory 604 contains instructions executable by the processing circuitry 602 such that the apparatus 600 is operable/configured to determine the presence of interference in one or more frequency ranges of a plurality of frequency ranges, after determining the presence of interference, determine that a transmission is to be made by the first wireless communication device, select one or more of the frequency ranges based on the determination of the presence of interference, and transmit the data using one or more of the plurality of frequency ranges other than the selected one or more frequency ranges. In some examples, the apparatus 600 is operable/configured to carry out the method 400 described above with reference to FIG. 4.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e., the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method in a first wireless communication device of transmitting data, the method comprising:

determining that each of a plurality of frequency ranges is free for a transmission by the first wireless communication device, the determining comprising performing a Listen Before Talk (LBT) procedure on each frequency range of the plurality of frequency ranges, the LBT procedure indicating that the frequency range is free for a transmission by the first wireless communication device;

selecting one or more of the frequency ranges of the plurality of frequency ranges, the selected one or more frequency ranges having been determined as free for a transmission by the first wireless communication device;

puncturing the selected one or more frequency ranges; and transmitting the data using one or more frequency ranges other than the selected one or more frequency ranges.

2. The method of claim 1, wherein selecting the one or more of the frequency ranges comprises selecting one or more frequency ranges that have been identified previously as being occupied by one or more signals from one or more other wireless communication devices, wherein the one or more signals from one or more other wireless communication devices comprise at least one narrowband, frequency hopping or BLUETOOTH signal.

3. The method of claim 1, wherein selecting the one or more of the frequency ranges comprises selecting one or more frequency ranges if any of the frequency ranges have been identified previously as being occupied by one or more signals from one or more other wireless communication devices.

4. The method of claim 1, wherein selecting the one or more of the frequency ranges comprises selecting one or more frequency ranges if one or more transmissions by the first wireless communication device on the one or more selected frequency ranges have been unsuccessful.

5. The method of claim 4, comprising selecting a first number of frequency ranges if the one or more transmissions that have been unsuccessful comprise a first number of transmissions less than a threshold number, and selecting a second number of frequency ranges if the one or more transmissions that have been unsuccessful comprise a second number of transmissions greater than a threshold number, wherein the first number of frequency ranges is less than the second number of frequency ranges.

6. The method of claim 1, wherein selecting the one or more of the frequency ranges comprises selecting the one or more of the frequency ranges based on at least one of an indication from another wireless communication device that one or more of the frequency ranges is experiencing or has experienced interference, and an indication identifying one or more of the frequency ranges that is experiencing or has experienced interference, wherein the another wireless communication device comprises a receiver of the data.

7. The method of claim 1, comprising, for each of a plurality of further transmissions for transmitting further data:

determining whether each of the plurality of frequency ranges other than the selected one or more frequency ranges is free for the further transmission by the first wireless communication device;

if one or more of the frequency ranges is not free more than a predetermined number of times, reselecting the selected one or more frequency ranges; and transmitting the further transmission data using one or more frequency ranges other than the selected one or more frequency ranges.

8. The method of claim 1, wherein transmitting the data using the one or more frequency ranges other than the selected one or more frequency ranges comprises transmitting the data according to an 802.11 standard.

9. The method of claim 1, wherein transmitting the data using the one or more frequency ranges other than the selected one or more frequency ranges comprises transmitting the data using unlicensed spectrum.

10. An apparatus in a first wireless communication device for transmitting data, the apparatus comprising a processor and a memory, the memory containing instructions executable by the processor such that the apparatus is operable to:

determine that each of a plurality of frequency ranges is free for a transmission by the first wireless communication device, the determining comprising performing a Listen Before Talk (LBT) procedure on each frequency range of the plurality of frequency ranges, the LBT procedure indicating that the frequency range is free for a transmission by the first wireless communication device;

select one or more of the frequency ranges of the plurality of frequency ranges, the selected one or more frequency ranges having been determined as free for a transmission by the first wireless communication device;

puncture the selected one or more frequency ranges; and transmit the data using one or more frequency ranges other than the selected one or more frequency ranges.

* * * * *